(12) United States Patent
Edvardsson (10) Patent No.: US 10,591,344 B2
(45) Date of Patent: Mar. 17, 2020

(54) RADAR LEVEL GAUGE SYSTEM WITH LOW REFLECTION SPACER ARRANGEMENT

(71) Applicant: Rosemount Tank Radar AB, Mölnlycke (SE)

(72) Inventor: Olov Edvardsson, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 301 days.

(21) Appl. No.: 15/641,702

(22) Filed: Jul. 5, 2017

(65) Prior Publication Data

US 2019/0011307 A1    Jan. 10, 2019

(51) Int. Cl.
*G01F 23/284*    (2006.01)
(52) U.S. Cl.
CPC .................................. *G01F 23/284* (2013.01)
(58) Field of Classification Search
None
See application file for complete search history.

(56) References Cited

U.S. PATENT DOCUMENTS

| | | | |
|---|---|---|---|
| 2008/0078244 | A1 | 4/2008 | Dietmeier |
| 2015/0177044 | A1 | 6/2015 | Edvardsson |
| 2015/0276462 | A1* | 10/2015 | Kleman .............. G01F 25/0076 342/124 |
| 2015/0377678 | A1* | 12/2015 | Edvardsson .......... G01F 23/284 342/124 |
| 2015/0377680 | A1 | 12/2015 | Edvardsson et al. |
| 2016/0320224 | A1 | 11/2016 | Eriksson |

FOREIGN PATENT DOCUMENTS

EP    3 088 853 A2    11/2016

OTHER PUBLICATIONS

EP Search Report from European Patent Application No. 18174941.7, dated Nov. 8, 2018.

* cited by examiner

*Primary Examiner* — Whitney Moore
(74) *Attorney, Agent, or Firm* — Westman, Champlin & Koehler, P.A.

(57) ABSTRACT

A radar level gauge system comprising a transceiver; a multi-conductor probe comprising a first probe conductor and a second probe conductor extending together from an upper probe end to a lower probe end; a plurality of spacer arrangements distributed along the multi-conductor probe; and processing circuitry for determining the filling level. Each spacer arrangement in the plurality of spacer arrangements comprises a first spacer member configured to reflect a transmit signal as a first spacer reflection signal having a first amplitude; and a second spacer member configured to reflect the transmit signal as a second spacer reflection signal having a second amplitude. The first spacer member and the second spacer member are arranged along the multi-conductor probe so that the first and second spacer reflection signals interact to provide a combined spacer reflection signal having an amplitude lower than each of the first amplitude and the second amplitude.

22 Claims, 10 Drawing Sheets

RADAR LEVEL GAUGE SYSTEM WITH LOW REFLECTION SPACER ARRANGEMENT

TECHNICAL FIELD OF THE INVENTION

The present invention relates to a radar level gauge system with a probe comprising a first probe conductor and a second probe conductor, and a plurality of spacers or spacer arrangements for controlling a positional relationship between the first probe conductor and the second probe conductor.

TECHNICAL BACKGROUND

Radar level gauge (RLG) systems are in wide use for determining filling levels in tanks. An electromagnetic transmit signal is generated by a transceiver and propagated towards the surface of the product in the tank, and an electromagnetic reflection signal resulting from reflection of the transmit signal at the surface is received by the transceiver.

Based on the transmit signal and the reflection signal, the distance to the surface of the product can be determined.

Most radar level gauge systems on the market today are either so-called pulsed radar level gauge systems that determine the distance to the surface of the product in the tank based on the difference in time between transmission of a pulse and reception of its reflection at the surface of the product, or systems that determine the distance to the surface based on the frequency difference between a transmitted frequency-modulated signal and its reflection at the surface. The latter type of system is generally referred to as being of the FMCW (Frequency Modulated Continuous Wave) type.

Radar level gauging is generally performed either by means of non-contact measurement, whereby electromagnetic signals are radiated towards the product in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank.

For guided wave radar level gauge systems, different kinds of probes may be used, for example depending on the characteristics of the product in the tank, or the environment in the tank. In some radar level gauge systems, it may be desirable to use a probe comprising a first probe conductor and a second probe conductor. Spacers may be provided to control the positional relation between the first probe conductor and the second probe conductor, for example, to prevent contact between the first probe conductor and the second probe conductor.

Using conventional pulsed radar level gauge systems, in which the transmit signal has relatively low frequencies (such as about 0.1-1 GHz), for "normal" applications (excluding for example high temperature high pressure—HTHP applications), known spacer configurations exhibit relatively low reflections, and can therefore be used without noticably influencing the filling level measurements. Such known spacer configurations may, for example, include spacers made of a low-reflection material, for example PTFE. For HTHP applications, it may however not be possible (or at least not desirable) to use spacers made by PTFE, but ceramic spacers may be preferred. However, ceramic spacers exhibit stronger reflections, which may be detrimental to the measurement quality. An example of such ceramic spacers is described in US 2008/0078244.

Further, it may be desirable to use higher frequencies (such as 1-2 GHz) for the transmit signal, which may make the measurements significantly more sensitive to spacer reflections, so that even the use of spacers made of a low-reflection material (such as PTFE) may disturb the filling level measurements.

It would thus be desirable to provide an improved guided wave radar level gauge system with a probe comprising a first probe conductor and a second probe conductor, in particular a guided wave radar level gauge system with less disturbance from spacers arranged to control the positional relation between the first and second probe conductors.

SUMMARY OF THE INVENTION

In view of the above, a general object of the present invention is to provide an improved guided wave radar level gauge system with a probe comprising a first probe conductor and a second probe conductor, in particular a guided wave radar level gauge system with less disturbance from spacers arranged to control the positional relation between the first and second probe conductors.

According to a first aspect of the present invention, it is provided a radar level gauge system, for determining a filling level of a product in a tank, the radar level gauge system comprising: a transceiver for generating, transmitting and receiving electromagnetic signals having a center frequency within a frequency band; a multi-conductor probe electrically coupled to the transceiver and arranged and configured to guide an electromagnetic transmit signal from the transceiver towards and into the product in the tank, and to return an electromagnetic surface echo signal resulting from reflection of the transmit signal at a surface of the product back towards the transceiver, the multi-conductor probe comprising a first probe conductor and a second probe conductor extending together from an upper probe end to a lower probe end; a plurality of spacers distributed along the probe for controlling a positional relation between the first probe conductor and the second probe conductor; and processing circuitry for determining the filling level based on the transmit signal and the surface echo signal, wherein each spacer in the plurality of spacers is configured to allow fluid flow along the multi-conductor probe past the spacer, and wherein each spacer in the plurality of spacers has a spacer extension along the probe, corresponding to at least a quarter of a wavelength of the transmit signal at the center frequency.

According to a second aspect of the present invention, it is provided a radar level gauge system, for determining a filling level of a product in a tank, the radar level gauge system comprising: a transceiver for generating, transmitting and receiving electromagnetic signals having a center frequency within a frequency band; a multi-conductor probe electrically coupled to the transceiver and arranged and configured to guide an electromagnetic transmit signal from the transceiver towards and into the product in the tank, and to return an electromagnetic surface echo signal resulting from reflection of the transmit signal at a surface of the product back towards the transceiver, the multi-conductor probe comprising a first probe conductor and a second probe conductor extending together from an upper probe end to a lower probe end; a plurality of spacer arrangements distributed along the probe for controlling a positional relation between the first probe conductor and the second probe conductor; and processing circuitry for determining the filling level based on the transmit signal and the surface echo signal, wherein each spacer in the plurality of spacers is configured to allow fluid flow along the multi-conductor probe past the spacer, and wherein each spacer arrangement in the plurality of spacer arrangements comprises: a first spacer member configured to reflect the transmit signal as a first spacer reflection signal having a first amplitude for the center frequency; and a second spacer member configured to reflect the transmit signal as a second spacer reflection signal having a second amplitude for the center frequency, wherein the first spacer member and the second spacer member are arranged along the probe in such a way that the first spacer reflection signal and the second spacer reflection signal interact to provide a combined spacer reflection signal having an amplitude for the center frequency that is lower than each of the first amplitude and the second amplitude.

The tank may be any container or vessel capable of containing a product.

The "transceiver" may be one functional unit capable of transmitting and receiving electromagnetic signals, or may be a system comprising separate transmitter and receiver units.

The multi-conductor probe may advantageously exhibit a probe impedance, along the entire multi-conductor probe from the first probe end to the second probe end, that is in the range of about 25Ω to about 150Ω.

Each of the first probe conductor and the second probe conductor may be essentially rigid or flexible and may be made from metal, such as stainless steel.

In embodiments, the first probe conductor may be a signal conductor and the second probe conductor may be a shielding conductor that completely or partly encloses the signal conductor. In such embodiments, the shielding conductor may be made from metal, such as stainless steel. For robustness in demanding applications, the metal thickness of the shielding conductor may be at least 0.5 mm, preferably at least 1.0 mm.

Further, the cross-section profile of the shielding conductor may be rounded or polygonal.

The present invention is based on the realization that spacers or spacer arrangements may be formed in such a way that reflections from different parts of the spacers or spacer arrangements interact to provide a lower total reflection in the relevant frequency range. This may open up for the use of a greater variety of spacer materials with suitable mechanical and/or thermal properties, such as ceramics. In addition the use of so-called FMCW techniques for guided wave radar systems with two-conductor probes may be facilitated, since the spacers or spacer arrangements according to embodiments of the present invention can be tuned to advantageous frequency ranges for FMCW sensing.

Various embodiments of the aspects of the present invention are provided in the dependent claims.

In summary, the present invention thus relates to a radar level gauge system comprising a transceiver; a multi-conductor probe comprising a first probe conductor and a second probe conductor extending together from an upper probe end to a lower probe end; a plurality of spacer arrangements distributed along the multi-conductor probe; and processing circuitry for determining the filling level. Each spacer arrangement in the plurality of spacer arrangements comprises a first spacer member configured to reflect a transmit signal as a first spacer reflection signal having a first amplitude; and a second spacer member configured to reflect the transmit signal as a second spacer reflection signal having a second amplitude. The first spacer member and the second spacer member are arranged along the multi-conductor probe so that the first and second spacer reflection signals interact to provide a combined spacer reflection signal having an amplitude lower than each of the first amplitude and the second amplitude.

BRIEF DESCRIPTION OF THE DRAWINGS

These and other aspects of the present invention will now be described in more detail, with reference to the appended drawings showing example embodiments of the invention, wherein.

DETAILED DESCRIPTION OF AN EXAMPLE EMBODIMENT OF THE INVENTION

In the present detailed description, various embodiments of the present invention are mainly discussed with reference to an FMCW-type radar level gauge system.

It should be noted that this by no means limits the scope of the present invention, which also covers a pulsed radar level gauge system.

Figure 1:
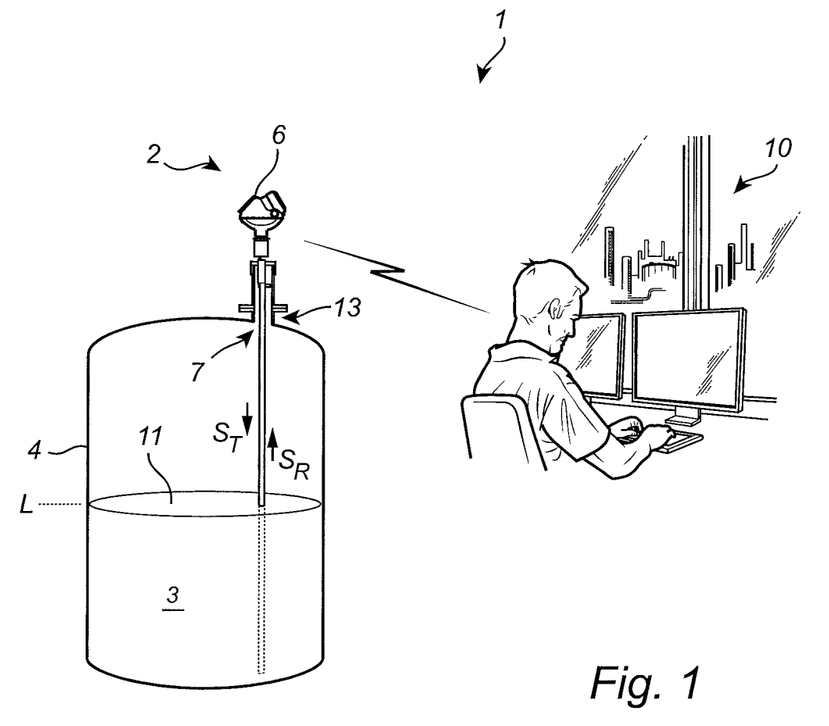
FIG. 1 schematically illustrates an exemplary tank arrangement comprising a radar level gauge system according to an embodiment of the present invention.

FIG. 1 schematically shows a level measuring system 1 comprising a radar level gauge system 2 according to an example embodiment of the present invention, and a host system 10 illustrated as a control room.

The radar level gauge system 2 of GWR (Guided Wave Radar) type is installed at a tank 4 having a tubular mounting structure 13 (often referred to as a "nozzle") extending substantially vertically from the roof of the tank 4.

The radar level gauge system 2 is installed to measure the filling level of a product 3 in the tank 4. The radar level gauge system 2 comprises a measuring unit 6 and a propagation device in the form of probe 7 extending from the measuring unit 6, through the tubular mounting structure 13, towards and into the product 3. In the example embodiment in FIG. 1, the probe 7 is a longitudinally open two-conductor probe. Configurations of the probe 7 will be described in greater detail further below.

By analyzing transmitted signals $S_T$ being guided by the probe 7 towards the surface 11 of the product 3, and reflected signals $S_R$ traveling back from the surface 11, the measurement unit 6 can determine the filling level of the product 3 in the tank 4. It should be noted that, although a tank 4 containing a single product 3 is discussed herein, the distance to any material interface along the probe can be measured in a similar manner.

The radar level gauge system in FIG. 1 will now be described in more detail with reference to the schematic block diagram in FIG. 2.

Using the radar level gauge system according to various embodiments of the present invention, the time-of-flight is determined based on the phase difference between the phase-modulated transmit signal and the surface reflection signal. This type of measurement scheme is often generally referred to as FMCW (Frequency Modulated Continuous Wave).

Figure 2:
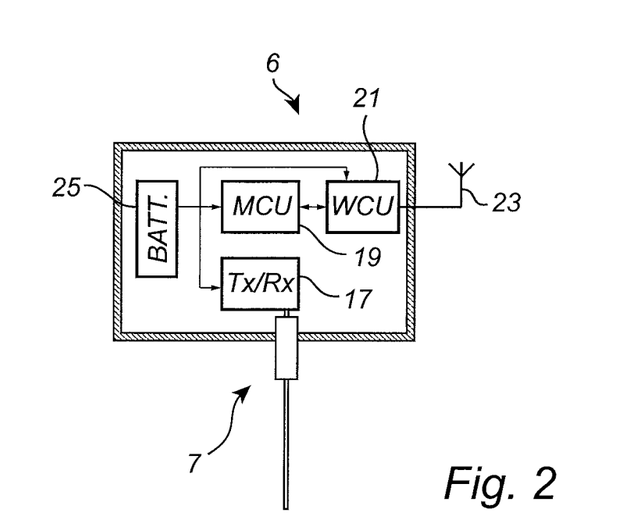
FIG. 2 is schematic illustration of the measurement unit comprised in the radar level gauge system in FIG. 1.

Referring to the schematic block diagram in FIG. 2, the measurement unit 6 of the radar level gauge system 2 in FIG. 1 comprises a transceiver 17, a measurement control unit (MCU) 19, a wireless communication control unit (WCU) 21, a communication antenna 23, and an energy store, such as a battery 25.

As is schematically illustrated in FIG. 2, the MCU 19 controls the transceiver 17 to generate, transmit and receive electromagnetic signals. The transmitted signals pass to the probe 7, and the received signals pass from the probe 7 to the transceiver 17.

The MCU 19 determines the filling level of the product 3 in the tank 4 based on the phase difference between the transmit signal $S_T$ and the reflected signal $S_R$. The filling level is provided to an external device, such as a control center from the MCU 19 via the WCU 21 through the communication antenna 23. The radar level gauge system 1 may advantageously be configured according to the so-called WirelessHART communication protocol (IEC 62591).

Although the measurement unit 6 is shown to comprise an energy store 25 and to comprise devices (such as the WCU 21 and the communication antenna 23) for allowing wireless communication, it should be understood that power supply and communication may be provided in a different way, such as through communication lines (for example 4-20 mA lines).

The local energy store need not only comprise a battery, but may alternatively, or in combination, comprise a capacitor or super-capacitor.

The radar level gauge system 2 in FIG. 1 will now be described in greater detail with reference to the schematic block diagram in FIG. 3.

Figure 3:
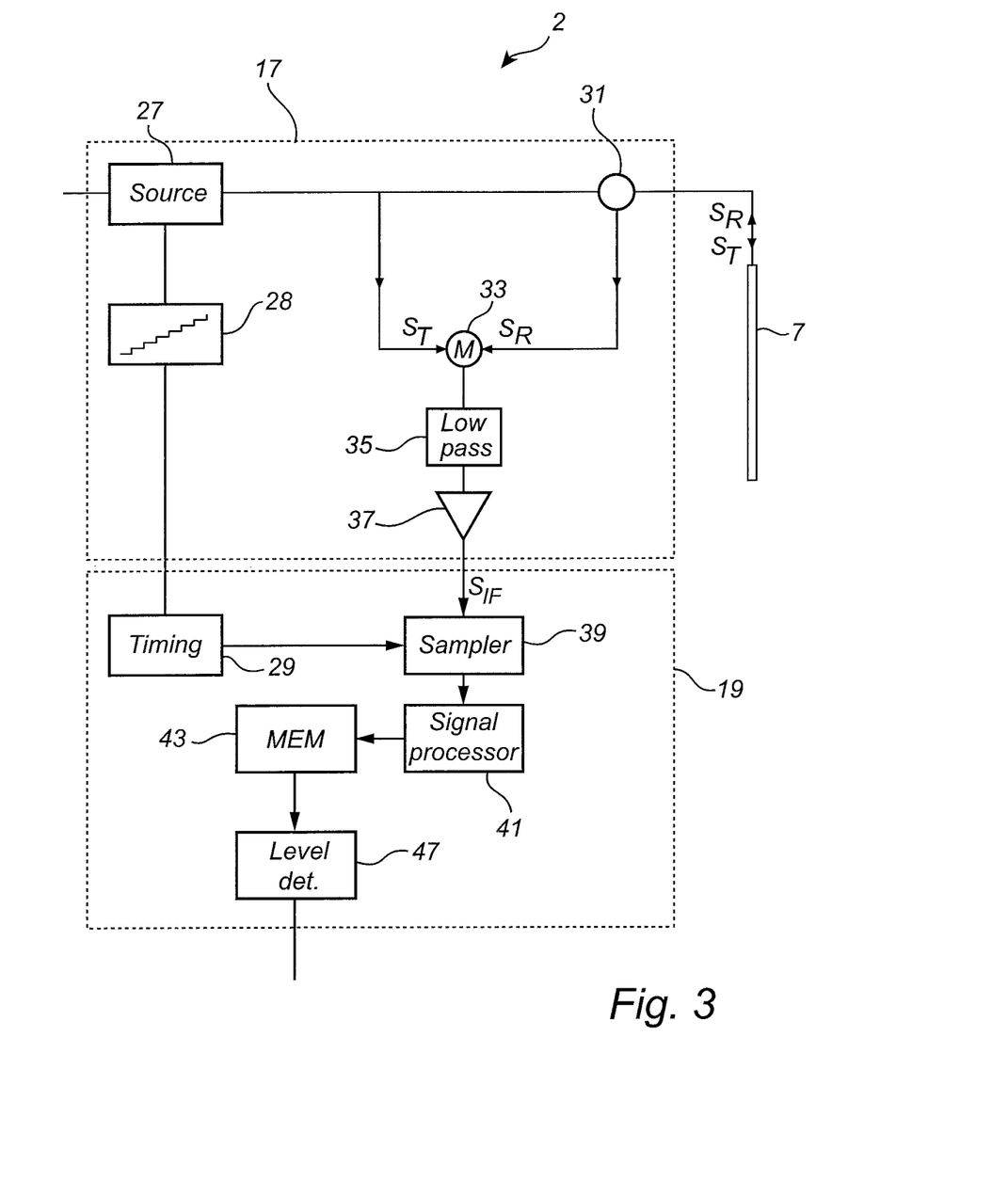
FIG. 3 is a schematic block diagram of a radar level gauge system according to an embodiment of the present invention.

Referring now to FIG. 3, there is shown a more detailed block diagram of the transceiver 17 and MCU 19 in FIG. 2.

The transceiver 17 here includes a microwave source 27 driven by a step generator 28, in turn controlled by timing circuitry 29 forming part of the MCU 19. The microwave source 27 is connected to the probe 7 via a power divider 31. The power divider 31 is arranged to connect a return signal from the probe 7 to a mixer 33, which is also connected to receive the signal from the microwave source 27. The mixer output is connected to a low pass filter 35 and an amplifier 37.

The processing circuitry 19 here includes, in addition to the timing circuitry 29 mentioned above, a sampler 39 configured to receive and sample the intermediate frequency signal $S_{IF}$ output by the mixer 33, low pass filtered by the low pass filter 35 and amplified by the amplifier 37. The sampler 39 may, for example, comprise a sample-and-hold circuit in combination with an A/D-converter, or be realized as a sigma-delta converter. The sampler 39 is controlled by the timing circuitry to be synchronized with the transmit signal $S_T$. The MCU 19 further includes a signal processor 41, a memory 43, and a level determinator 47.

While the elements of the transceiver 17 are typically implemented in hardware, and form part of an integrated unit normally referred to as a microwave unit, at least some portions of the MCU 19 may typically be embodied by software modules executed by an embedded processor. The invention is not restricted to this particular realization, and any implementation found suitable to realize the herein described functionality may be contemplated.

Figure 4:
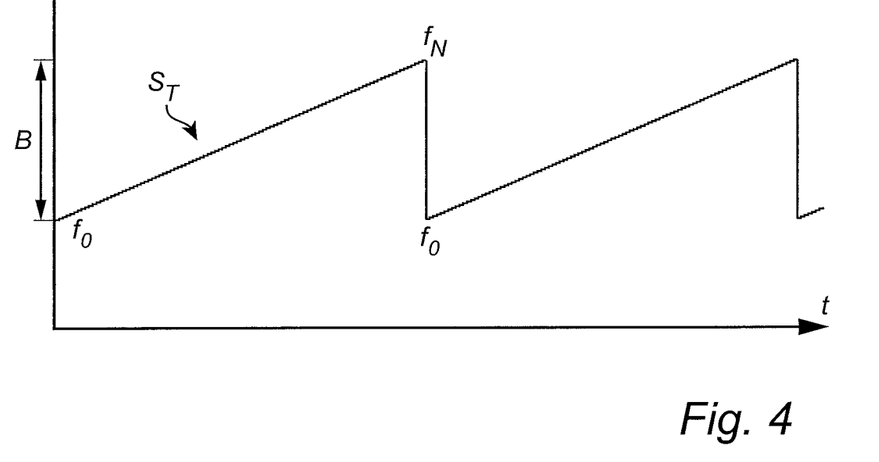
FIG. 4 schematically illustrates an example of a transmit signal transmitted by the transceiver in a radar level gauge system according to an embodiment of the invention.

With reference to FIG. 3, the timing circuitry 29 controls the microwave source 27 via the step generator 28 for form the transmit signal $S_T$. Referring to FIG. 4, the transmit signal $S_T$ is provided in the form of a time sequence $f_0$-$f_N$ of a number of discrete and mutually different frequencies $f_n$. As is schematically indicated in FIG. 4, the discrete and mutually different frequencies $f_0$-$f_N$ define a bandwidth B. In this particular example, the frequencies adjacent in terms of frequency are also adjacent in the time sequence, but this is not necessarily the case. Alternatively, the discrete and mutually different frequencies may be output in an arbitrary but known order.

The reflection signal $S_R$ results from reflection of the transmit signal $S_T$ at impedance discontinuities (including the surface 11 indicated in FIG. 1). Due to the time-of-flight from the radar level gauge system to the different impedance discontinuities and back, the reflection signal $S_R$ will be a delayed copy of the transmit signal $S_T$, where the portions of the reflection signal $S_R$ reflected from the different impedance discontinuities will exhibit different phase differences as compared to the transmit signal $S_T$. The phase differences will, furthermore, change in steps with the changes in transmitted discrete frequency $f_n$.

Figure 5:
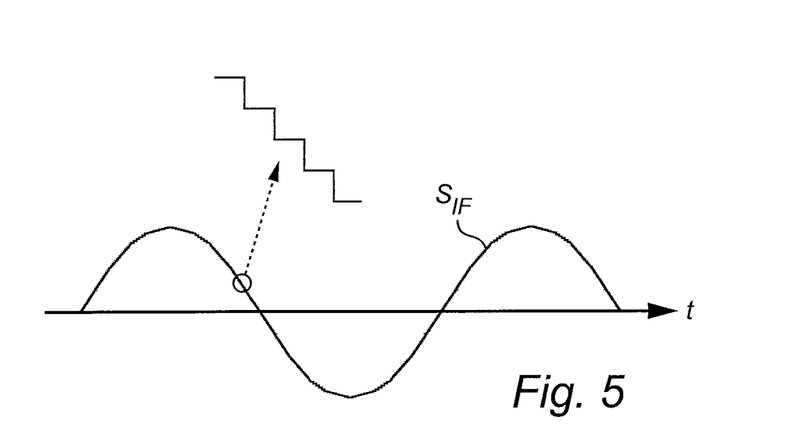
FIG. 5 is a diagram showing the intermediate frequency signal resulting from the transmit signal.

An intermediate frequency signal $S_{IF}$ is formed by combining the transmit signal $S_T$ and the reflection signal $S_R$ in the mixer 33. The intermediate frequency signal $S_{IF}$ is schematically shown in FIG. 5.

If a transmit signal with a continuously varying frequency had been used, the intermediate frequency signal would have been a continuous signal comprising one frequency component for each time-of-flight corresponding to the different impedance discontinuities encountered by the transmit signal.

Since the transmit signal $S_T$ is instead a sequence of discrete frequencies $f_n$, the phase difference will vary in steps, which means that the intermediate frequency signal $S_{IF}$ will be piece-wise constant with the same duration of the constant portions as the duration of transmission of the different frequencies $f_n$ of the transmit signal $S_T$. This is schematically indicated in FIG. 5.

The intermediate frequency signal $S_{IF}$, which has been sampled by the sampler 39 in FIG. 3 is processed by the signal processor 41 in order to determine a data set indicative of surface echo candidates. The intermediate frequency signal $S_T$ in FIG. 5 is first transformed from the time domain to the frequency domain using, for example, FFT (Fast Fourier Transform). Following transformation to the frequency domain of the intermediate frequency signal $S_F$, the resulting frequency spectrum is transformed to an echo curve, which is used by the level determinator 47 to determine the filling level of the product 3 in the tank 4.

Figures 6A, 6B, 6C:
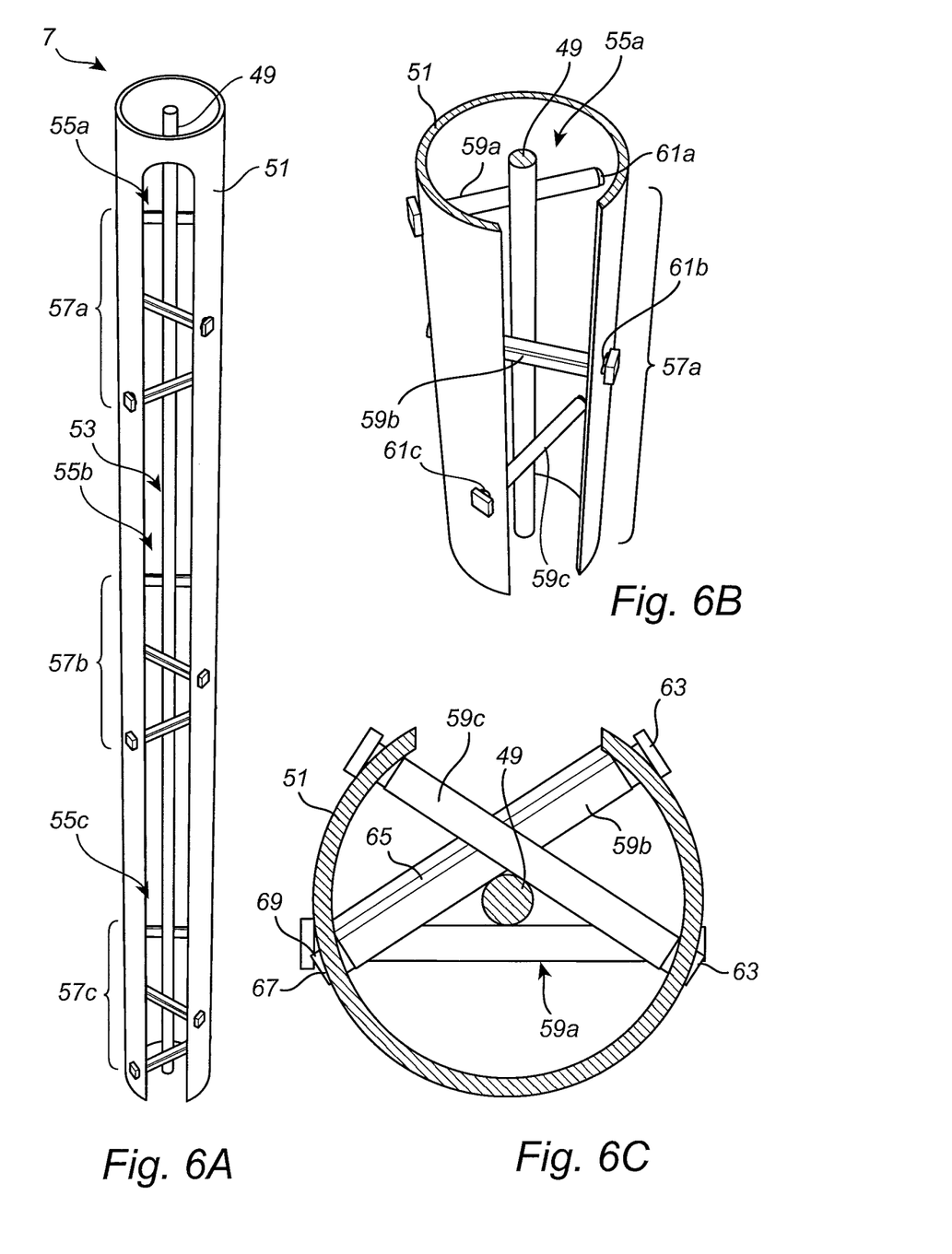
FIG. 6A schematically shows a first example of the probe configuration of the radar level gauge system in FIG. 1, in which each spacer arrangement has three spacer members.
FIG. 6B is an enlarged view of a spacer region of the probe configuration in FIG. 6A.
FIG. 6C is a view from above of the spacer region in FIG. 6B.

A first example configuration of the probe 7 comprised in the radar level gauge system 2 in FIG. 1 will now be described with reference to FIG. 6A. As is schematically shown in FIG. 6A, the probe 7 comprises a first probe conductor 49 and a second conductor 51. As is indicated in FIG. 6A, the second probe conductor 51 has a longitudinal opening 53 extending along a portion of the probe 7. The probe 7 further comprises a plurality of spacer arrangements 55a-c arranged in spacer regions 57a-c spaced apart along the probe 7. An example of these spacer arrangements 55a-c will be described in greater detail below, with reference to FIG. 6B and FIG. 6C.

Referring now to FIG. 6B, which is an enlarged view of the first spacer region 57a of the probe 7, the spacer arrangement 55a comprises first, second, and third spacer members, here in the form of first 59a, second 59b, and third 59c ceramic pins, and the second probe conductor 51 comprises first, second, and third spacer retaining structures, here in the form of first 61a, second 61b, and third 61c sets of holes in the second probe conductor 51, which is here a shielding conductor (only one hole in each set of holes is indicated by reference numerals in FIGS. 6B and 6C to avoid cluttering the drawings).

With reference also to FIG. 6C, which is a view from above of the first spacer region 57a, each of the first 59a, second 59b, and third 59c spacer member comprises a head 63, a body 65, and a tip 67. In FIG. 6C, these portions of each spacer member is only indicated with reference numerals for the first spacer member 59b, to avoid cluttering the drawings. As is schematically indicated in FIG. 6C, the tip 67 of the spacer member 59b includes a radial protrusion 69. To attach the spacer member 59b to the shielding conductor 51 (restrict movement of the spacer member 59b in relation to the shielding conductor), the holes 61b may be configured to allow the spacer member 59b, including the radial protrusion 69 of the tip 67 to pass through the holes 61b in one rotational state only, allowing the spacer member 59b to be locked in place through rotation around its longitudinal axis. The same is, of course, true also for the first 59a and third 59c spacer members.

As is clear from FIG. 6B and FIG. 6C, spacer retaining structures 61a-c thus co-operate with their respective spacer members 59a-c to attach the spacer members 59a-c to the second conductor 51 in the spacer region 57a to control a positional relationship between the first probe conductor 49 and the second probe conductor 51. Further, the spacer arrangements 55a-c are, in this example embodiment, thus configured to do so with only minimal contact between the spacer members 59a-c and the first probe conductor 49.

In each spacer arrangement 55a-c, the first spacer member 59a is configured to reflect the transmit signal as a first spacer reflection signal having a first amplitude for the center frequency of the transmit signal. The second spacer member 59b is configured to reflect the transmit signal as a second spacer reflection signal having a second amplitude for the center frequency of the transmit signal. The third spacer member 59c, arranged between the first spacer member 59a and the second spacer member 59b along the probe 7, is configured to reflect the transmit signal as a third spacer reflection signal having a third amplitude for the center frequency of the transmit signal. The third amplitude is higher than the first amplitude and the second amplitude. In the example configuration of FIGS. 6A-C, the third spacer member 59c has a greater transversal dimension (such as diameter) than the first 59a and second 59b spacer members.

The first spacer member, the second spacer member, and the third spacer member are arranged along the probe in such a way that the first spacer reflection signal, the second spacer reflection signal, and the third spacer reflection signal interact to provide a combined spacer reflection signal having an amplitude for the center frequency lower than the third amplitude. In particular, in the present example configuration, the distance along the probe 7 between the first spacer member 59a and the third spacer member 59c may be around one quarter of the wavelength of the transmit signal at the center frequency of the transmit signal. The distance along the probe 7 between the second spacer member 59b and the third spacer member 59c may be about the same as the distance along the probe 7 between the first spacer member 59a and the third spacer member 59c.

In the example configuration schematically shown in FIGS. 6A-C, each of the first 59a to third 59c spacer members are in contact with the first probe conductor 49 and the second probe conductor 51. It should be noted that this may not necessarily be the case, but that at least one of the spacer members, for example the third spacer member 59c, may be configured to control the positional relationship between the first probe conductor 49 and the second probe conductor 51, while at least one other one of the spacer members, for example the first 59a and second 59b spacer members may be in mechanical contact with only one of the first probe conductor 49 and the second probe conductor 51.

Figures 7A, 7B:
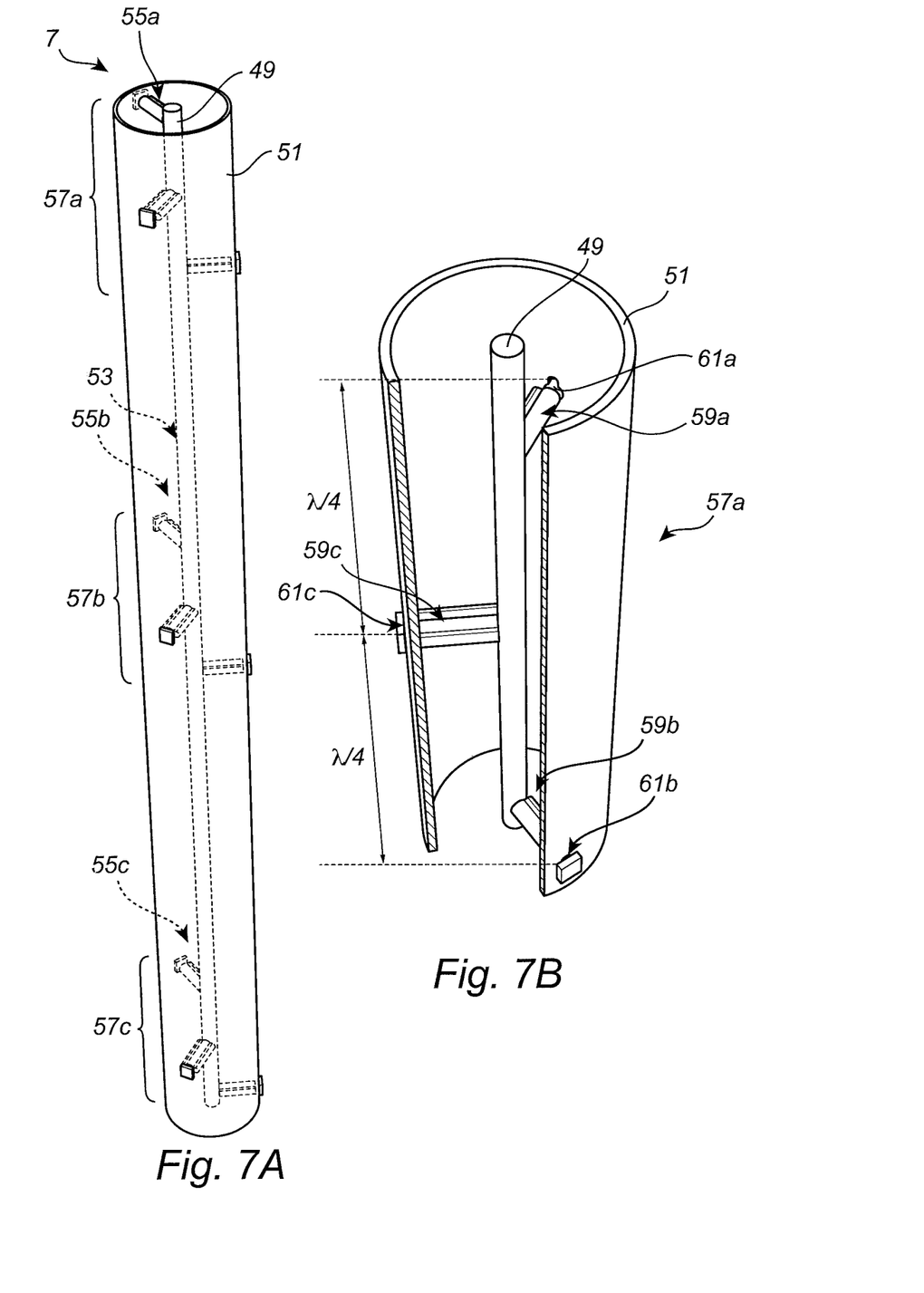
FIGS. 7A-E schematically illustrate a second example of the probe configuration of the radar level gauge system in FIG. 1, in which each spacer arrangement has three spacer members.

A second example configuration of the probe 7 comprised in the radar level gauge system 2 in FIG. 1 will now be described with reference to FIG. 7A. As is schematically shown in FIG. 7A, the probe 7 comprises a first probe conductor 49 and a second conductor 51. As in the first example configuration in FIGS. 6A-C, the probe 7 in FIG. 7A further comprises a plurality of spacer arrangements 55a-c arranged in spacer regions 57a-c spaced apart along the probe 7. An example of these spacer arrangements 55a-c will be described in greater detail below, with reference to FIGS. 7B-E.

Referring now to FIG. 7B, which is an enlarged view of the first spacer region 57a of the probe 7, the spacer arrangement 55a comprises first, second, and third spacer members, here in the form of first 59a, second 59b, and third 59c ceramic pins, and the second probe conductor 51 comprises first, second, and third spacer retaining structures, here in the form of first 61a, second 61b, and third 61c holes in the second probe conductor 51, which is here a shielding conductor.

Figure 7C:
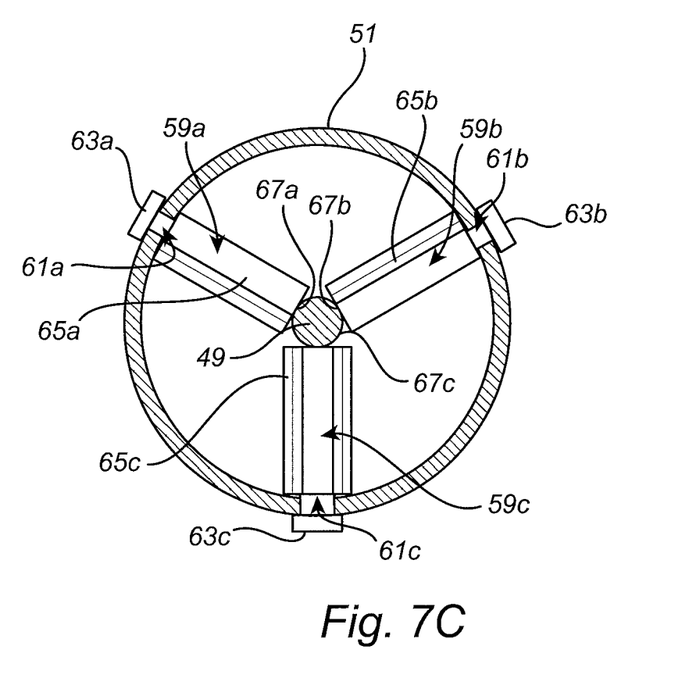

With reference also to FIG. 7C, which is a view from above of the first spacer region 57a, each of the first 59a, second 59b, and third 59c spacer member comprises a head 63a-c, a body 65a-c, and a tip 67a-c. As is schematically indicated in FIG. 7C, each spacer member 59a-c is inserted through corresponding holes 61a-c in the second probe conductor so that the tips 67a-c of the spacer member 59a-c control the positional relationship between the first probe conductor 49 and the second probe conductor 51.

In each spacer arrangement 55a-c, the first spacer member 59a is configured to reflect the transmit signal as a first spacer reflection signal having a first amplitude for the center frequency of the transmit signal. The second spacer member 59b is configured to reflect the transmit signal as a second spacer reflection signal having a second amplitude for the center frequency of the transmit signal. The third spacer member 59c, arranged between the first spacer member 59a and the second spacer member 59b along the probe 7, is configured to reflect the transmit signal as a third spacer reflection signal having a third amplitude for the center frequency of the transmit signal. The third amplitude is higher than the first amplitude and the second amplitude. In this particular example configuration, the third spacer member 59c has a bigger transversal area than the first 59a and second 59b spacer members.

The first spacer member 59a, the second spacer member 59b, and the third spacer member 59c are arranged along the probe in such a way that the first spacer reflection signal, the second spacer reflection signal, and the third spacer reflection signal interact to provide a combined spacer reflection signal having an amplitude for the center frequency lower than the third amplitude. In particular, in the present example configuration, the distance along the probe 7 between the first spacer member 59a and the third spacer member 59c may be around one quarter of the wavelength of the transmit signal at the center frequency of the transmit signal. The distance along the probe 7 between the second spacer member 59b and the third spacer member 59c may be about the same as the distance along the probe 7 between the first spacer member 59a and the third spacer member 59c.

Figures 7D, 7E:
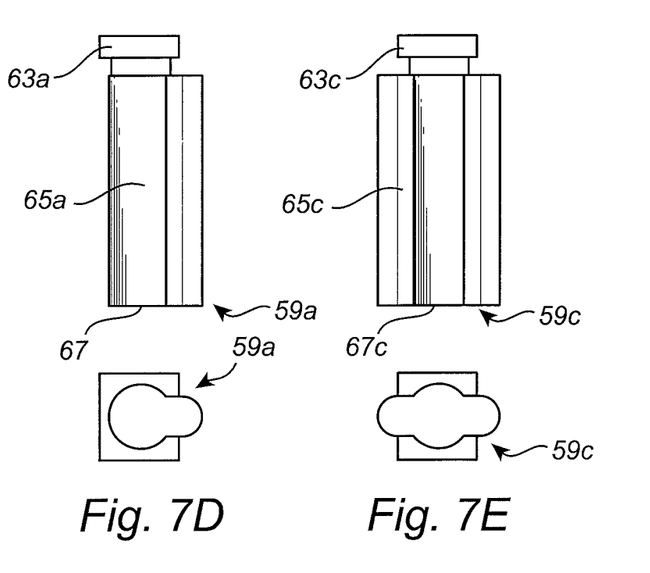

The spacer members 59a-c can be kept in place in relation to the first probe conductor 49 and the second probe conductor 51 in various ways. One example configuration to achieve this is schematically illustrated in FIG. 7D for the first 59a and second 59b probe members, and in FIG. 7E for the third probe member 59c. As is schematically shown in FIG. 7D and FIG. 7E, the bodys 65a-c of the probe members 59a-c are rotationally non-symmetrical. By means of corresponding configurations of the mounting holes 61a-c, the probe members 59a-c can be inserted into their corresponding mounting holes 61a-c, much like keys in keyholes. When the probe members 59a-c have been fully inserted, as defined by the head 63a-c of each probe member 59a-c, the probe member can be rotate a quarter revolution to thereby restrict axial movement of the probe members 59a-c in relation to the second probe member 51.

In the example configuration schematically shown in FIGS. 7A-E, the tips 67a-c of each of the first 59a to third 59c spacer members are in contact with the first probe conductor 49. It should be noted that this may not necessarily be the case, but that at least one of the spacer members, for example the third spacer member 59c, may be configured to control the positional relationship between the first probe conductor 49 and the second probe conductor 51, while at least one other one of the spacer members, for example the first 59a and second 59b spacer members may be in mechanical contact with only the second probe conductor 51.

Figures 8A, 8B:
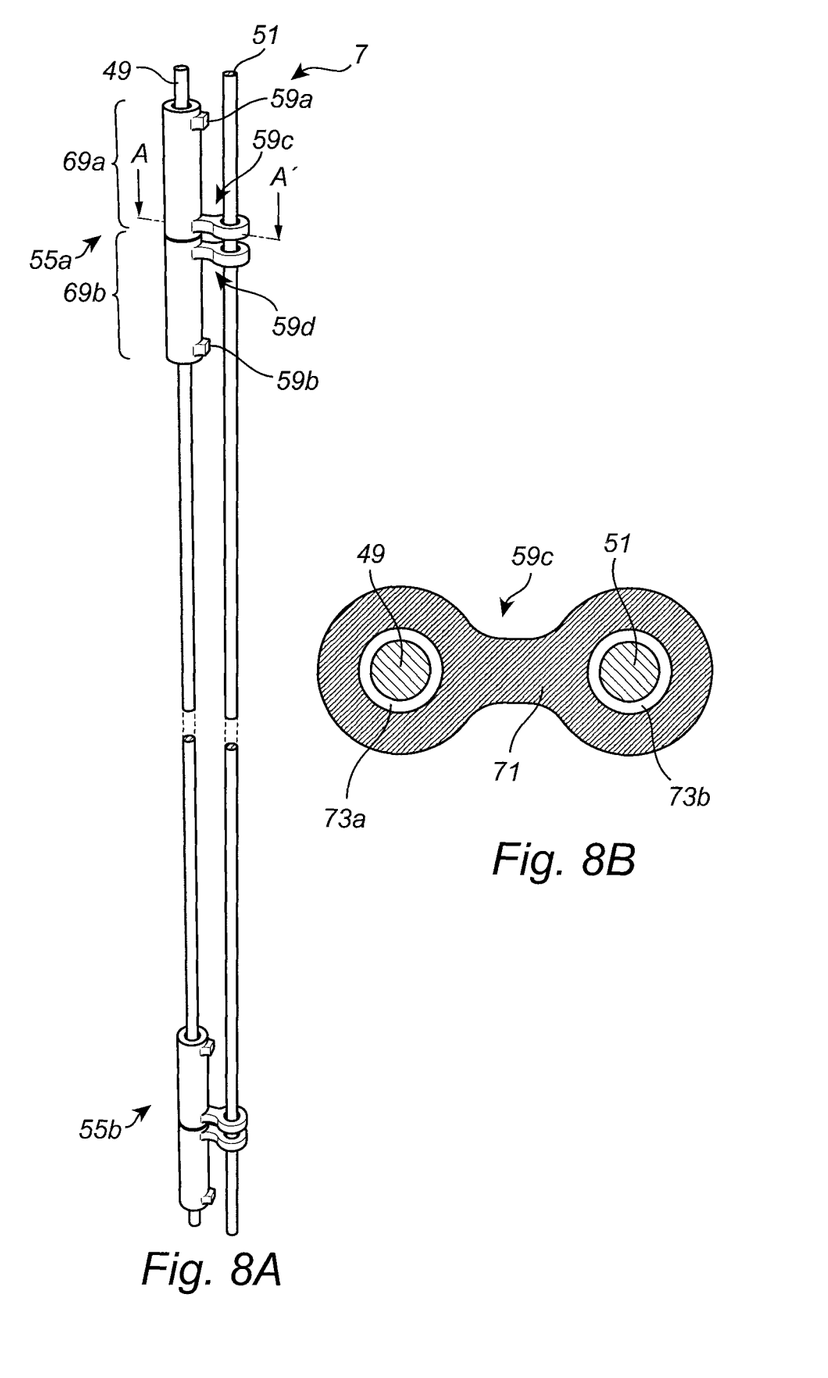
FIGS. 8A-B schematically illustrate a third example of the probe configuration of the radar level gauge system in FIG. 1, in which each spacer arrangement has four spacer members.

A third example configuration of the probe 7 comprised in the radar level gauge system 2 in FIG. 1 will now be described with reference to FIG. 8A, and FIG. 8B, which is a cross-section view of the probe in FIG. 8A in the section A-A' in FIG. 8A. As is schematically shown in FIG. 8A, the example probe 7 is a so-called twin-line probe comprising a first probe conductor 49 and a second conductor 51. The probe 7 in FIG. 8A further comprises a plurality of spacer arrangements 55a-b spaced apart along the probe 7.

As is schematically shown in FIG. 8A for the first spacer arrangement 55a only to avoid cluttering the drawings, each spacer arrangement 55a comprises first 59a, second 59b, third 59c, and fourth 59d spacer members. In this particular example, each spacer arrangement 55a is formed by a first spacer part 69a and a second spacer part 69b. The first 69a and second 69b spacer parts may be substantially identical, and arranged with opposite longitudinal orientations, as illustrated in FIG. 8A.

Further, as is schematically shown in FIG. 8B, the spacer parts 69a-b may be made of an electrically conductive material 71. Suitably, the spacer parts 69a-b may be made of a metal, such as stainless steel. To prevent short-circuiting the first probe conductor 49 and the second probe conductor 51, each spacer part 69a-b further comprises non-conducting sleeves 73a-b provided between the conductive material 71 and the first 49 and second 51 probe conductor, respectively.

Figure 9:
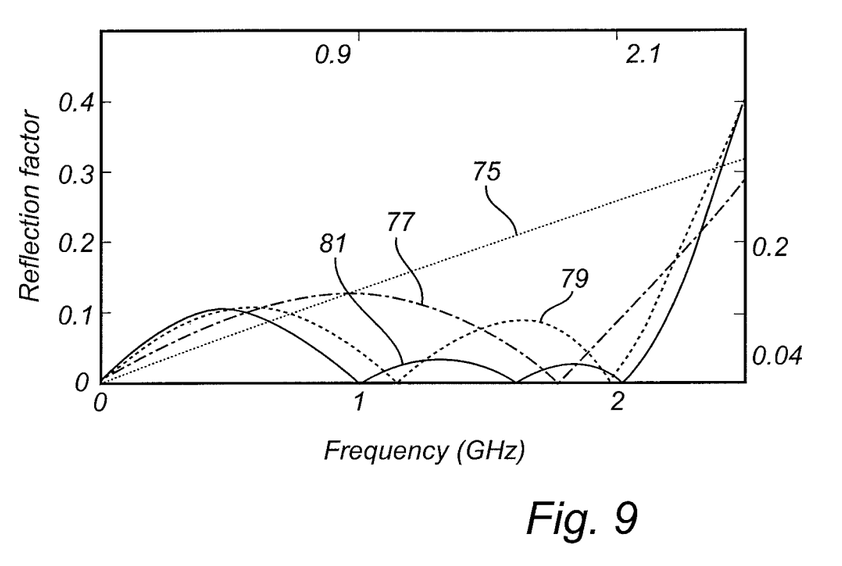
FIG. 9 is a diagram illustrating a simulated spacer arrangement reflection for different configurations with different numbers of spacer members.

Compared to a conventional spacer, the provision of at least first and second spacer members suitably spaced apart along the first 49 and second 51 probe conductors, can substantially reduce the reflection from each spacer arrangement 55a-c, at least in the frequency band of the transmit signal. The diagram in FIG. 9 illustrates a simulated spacer arrangement reflection for different configurations with different numbers of spacer members. In FIG. 9, a first curve 75 is the simulated reflection factor for the situation with a single spacer member made of a ceramic material. A second curve 77 is the simulated reflection factor for a spacer arrangement with two spacer members, both having the same individual reflection factor, and being spaced apart along the probe 7 by approximately one quarter of the wavelength of the transmit signal at the center frequency. A third curve 79 is the simulated reflection factor for a spacer arrangement with three spacer members with approximately one quarter of the wavelength of the transmit signal at the center frequency between the spacer members, where the individual reflection factor of the center spacer member is higher than the individual reflection factor of the top and bottom spacer members. A fourth curve 81 is the simulated reflection factor for a spacer arrangement with four spacer members with approximately one quarter of the wavelength of the transmit signal at the center frequency between the spacer members, where the individual reflection factor of the two center spacer members is higher than the individual reflection factor of the top and bottom spacer members.

As can be seen in FIG. 9, a single spacer member here results in a reflection factor of about 0.2 (~−14 dB) with a roughly linear frequency variation. For two spacer members, the reflection is low at the center frequency but with a rather narrow bandwidth (~14%). Three spacer members (with the center spacer member having an individual reflection factor of about 0.2) gives a better bandwidth (53%), and with four spacer members, the bandwidth above is 80% or 0.9-2.1 GHz. The bandwidths are chosen to give a reflection <−29 dB. That is a useful value as oil has reflection factor of 0.2 (or −14 dB), while very light hydrocarbons (such as liquid natural gas) can have −21 dB. It is understood that the bandwidth and the maximum reflection within that bandwidth are inter-related and subject to optimization. About three or four space members may be advantageous in practice, but more points would improve (=decrease) reflection and/or increase the bandwidth.

Figures 10A, 10B, 10C, 10D, 10E, 10F:
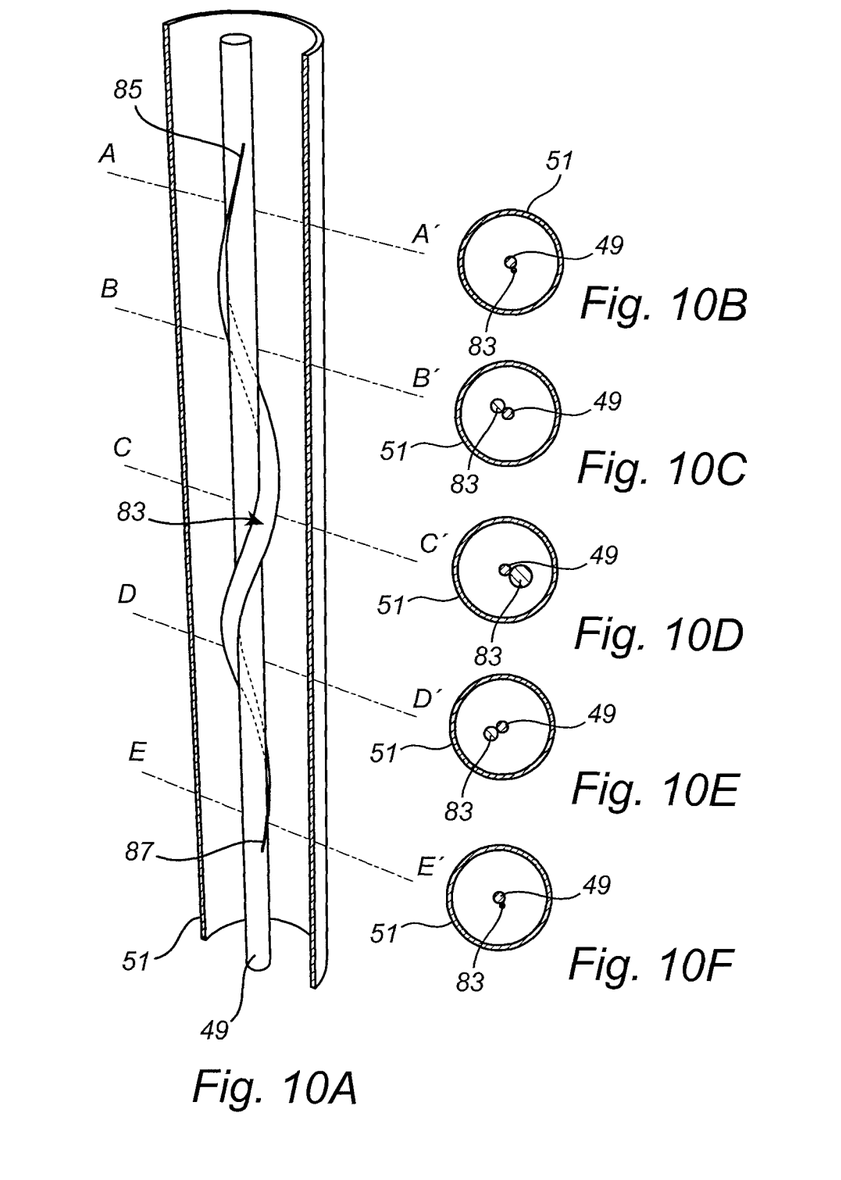
FIGS. 10A-F schematically illustrate a fourth example of the probe configuration of the radar level gauge system in FIG. 1, in which each spacer extends at least a quarter of a center frequency wavelength along the probe.

FIGS. 10A-F schematically illustrate a fourth example of the probe configuration of the radar level gauge system in FIG. 1, in which each spacer 83 (only one spacer is shown in FIGS. 10A-F) extends at least a quarter of a center frequency wavelength along the probe 7. FIG. 10A is a side view of a probe 7 with a first probe conductor 49 and a second probe conductor 51. In the present example, the probe 7 is a coaxial probe, the first probe conductor 49 is a center conductor and the second probe conductor 51 is a shielding conductor. In FIG. 10A, the second probe conductor 51 is shown to be partly open to allow view of the spacer 83. FIG. 10B is a cross-section view at the section A-A' in FIG. 10A, FIG. 10C is a cross-section view at the section B-B' in FIG. 10A, FIG. 10D is a cross-section view at the section C-C' in FIG. 10A, FIG. 10E is a cross-section view at the section D-D' in FIG. 10A, and FIG. 10F is a cross-section view at the section E-E' in FIG. 10A.

The impedance of the spacer 83 varies within the spacer extension. In the example spacer configuration of FIGS. 10A-E, the impedance varies substantially continuously from a relatively high impedance at a top end 85 of the spacer 83, to a minimum impedance at the center of the spacer 83, and back to the relatively high impedance at the bottom end 87 of the spacer 83. In the present example configuration, this substantially continuous variation in impedance within the spacer extension is achieved by varying the lateral dimension along the spacer 83 as can be seen in FIGS. 10B-F.

As is schematically shown in FIGS. 10A-F, the spacer 83 is helically wound around the first probe conductor 49. In this example configuration, the spacer 83 is helically wound around the first probe conductor less than one full revolution, which facilitates mounting of the spacers 83 on the first probe conductor 49.

Figure 11:
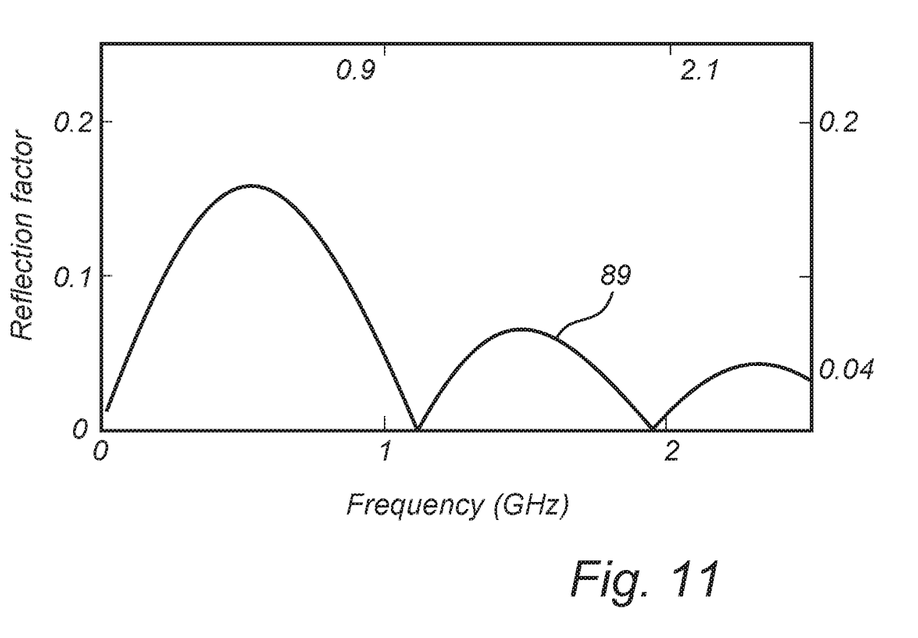
FIG. 11 is a diagram illustrating a simulated spacer reflection for the spacer configuration in FIGS. 10A-F.

FIG. 11 is a diagram illustrating a simulated spacer reflection for the spacer configuration in FIGS. 10A-F. In FIG. 11, curve 89 illustrates the reflection behavior for the example spacer configuration 83 in FIGS. 10A-F.

The person skilled in the art realizes that the present invention by no means is limited to the preferred embodiments described above. On the contrary, many modifications and variations are possible within the scope of the appended claims.

What is claimed is:

1. A radar level gauge system, for determining a filling level of a product in a tank, said radar level gauge system comprising:
    a transceiver for generating, transmitting and receiving electromagnetic signals having a center frequency within a frequency band;
    a multi-conductor probe electrically coupled to said transceiver and arranged and configured to guide an electromagnetic transmit signal from said transceiver towards and into said product in the tank, and to return an electromagnetic surface echo signal resulting from reflection of said transmit signal at a surface of said product back towards said transceiver, said multi-conductor probe comprising a first probe conductor and a second probe conductor extending together from an upper probe end to a lower probe end;
    a plurality of spacers distributed along the multi-conductor probe for controlling a positional relation between the first probe conductor and the second probe conductor; and
    processing circuitry for determining said filling level based on said transmit signal and said surface echo signal,
    wherein each spacer in said plurality of spacers is configured to allow fluid flow along said multi-conductor probe past said spacer,
    wherein each spacer in said plurality of spacers has a spacer extension along said multi-conductor probe, corresponding to at least a quarter of a wavelength of the transmit signal at said center frequency, and
    wherein each spacer in said plurality of spacers is configured in such a way that said multi-conductor probe, within said spacer extension, exhibits a first probe portion with a first impedance, a second probe portion with a second impedance, and a third probe portion, between said first probe portion and said second probe portion, with a third impedance lower than said first impedance and said second impedance.

2. The radar level gauge system according to claim 1, wherein said spacer extension along said multi-conductor probe corresponds to at least one half of a wavelength of the transmit signal at said center frequency.

3. The radar level gauge system according to claim 1, wherein said impedance varies substantially continuously within said spacer extension.

4. The radar level gauge system according to claim 3, wherein each spacer in said plurality of spacers is helically wound around said first probe conductor.

5. The radar level gauge system according to claim 4, wherein each spacer in said plurality of spacers is helically wound around said first probe conductor less than one full revolution.

6. The radar level gauge system according to claim 1, wherein each spacer in said plurality of spacers comprises:
    a first spacer portion configured to reflect said transmit signal as a first spacer reflection signal having a first amplitude for said center frequency; and
    a second spacer portion configured to reflect said transmit signal as a second spacer reflection signal having a second amplitude for said center frequency,
    wherein said first spacer portion and said second spacer portion are arranged along the multi-conductor probe in such a way that the first spacer reflection signal and the second spacer reflection signal interact to provide a combined spacer reflection signal having an amplitude for said center frequency that is lower than each of said first amplitude and said second amplitude.

7. The radar level gauge system according to claim 6, wherein at least one of said first spacer portion and said second spacer portion is in mechanical contact with the first probe conductor and the second probe conductor for locally controlling said positional relation between the first probe conductor and the second probe conductor.

8. The radar level gauge system according to claim 6, wherein each spacer in said plurality of spacers further comprises:
    a third spacer portion, between said first spacer portion and said second spacer portion, the third spacer portion being configured to reflect said transmit signal as a third spacer reflection signal having a third amplitude for said center frequency higher than said first amplitude and said second amplitude,
    wherein said first spacer portion, said second spacer portion, and said third spacer portion are arranged along the multi-conductor probe in such a way that the first spacer reflection signal, the second spacer reflection signal, and the third spacer reflection signal interact to provide a combined spacer reflection signal having an amplitude for said center frequency lower than said third amplitude.

9. The radar level gauge system according to claim 8, wherein at least said third spacer portion is in mechanical contact with the first probe conductor and the second probe conductor for locally controlling said positional relation between the first probe conductor and the second probe conductor.

10. The radar level gauge system according to claim 9, wherein each of said first spacer portion and said second spacer portion only partly extends between the first probe conductor and the second probe conductor.

11. The radar level gauge system according to claim 1, wherein said second probe conductor at least partly surrounds said first probe conductor.

12. The radar level gauge system according to claim 1, wherein said center frequency is in the range of 0.5 GHz to 3 GHz.

13. The radar level gauge system according to claim 1, wherein:
said transmit signal is modulated to exhibit a time-varying frequency;
said transceiver comprises a mixer for mixing said transmit signal and said surface echo signal to form an intermediate frequency signal; and
said processing circuitry is configured to determine said filling level based on said intermediate frequency signal.

14. A radar level gauge system, for determining a filling level of a product in a tank, said radar level gauge system comprising:
a transceiver for generating, transmitting and receiving electromagnetic signals having a center frequency within a frequency band;
a multi-conductor probe electrically coupled to said transceiver and arranged and configured to guide an electromagnetic transmit signal from said transceiver towards and into said product in the tank, and to return an electromagnetic surface echo signal resulting from reflection of said transmit signal at a surface of said product back towards said transceiver, said multi-conductor probe comprising a first probe conductor and a second probe conductor extending together from an upper probe end to a lower probe end;
a plurality of spacer arrangements distributed along the multi-conductor probe for controlling a positional relation between the first probe conductor and the second probe conductor; and
processing circuitry for determining said filling level based on said transmit signal and said surface echo signal,
wherein each spacer in said plurality of spacers is configured to allow fluid flow along said multi-conductor probe past said spacer, and
wherein each spacer arrangement in said plurality of spacer arrangements comprises:
a first spacer member configured to reflect said transmit signal as a first spacer reflection signal having a first amplitude for said center frequency; and
a second spacer member configured to reflect said transmit signal as a second spacer reflection signal having a second amplitude for said center frequency; and
a third spacer member, between said first spacer member and said second spacer member along said multi-conductor probe, the third spacer member being configured to reflect said transmit signal as a third spacer reflection signal having a third amplitude for said center frequency higher than said first amplitude and said second amplitude,
wherein said first spacer member, said second spacer member, and said third spacer member are arranged along the multi-conductor probe in such a way that the first spacer reflection signal, the second spacer reflection signal, and the third spacer reflection signal interact to provide a combined spacer reflection signal having an amplitude for said center frequency lower than said third amplitude.

15. The radar level gauge system according to claim 14, wherein at least one of said first spacer member and said second spacer member is in mechanical contact with the first probe conductor and the second probe conductor for locally controlling said positional relation between the first probe conductor and the second probe conductor.

16. The radar level gauge system according to claim 14, wherein at least said third spacer member is in mechanical contact with the first probe conductor and the second probe conductor for locally controlling said positional relation between the first probe conductor and the second probe conductor.

17. The radar level gauge system according to claim 16, wherein each of said first spacer member and said second spacer member only partly extends between the first probe conductor and the second probe conductor.

18. The radar level gauge system according to claim 14, wherein said second probe conductor at least partly surrounds said first probe conductor.

19. The radar level gauge system according to claim 14, wherein each spacer arrangement in said plurality of spacer arrangements has a spacer extension along said multi-conductor probe, corresponding to at least a quarter of a wavelength of the transmit signal at said center frequency.

20. The radar level gauge system according to claim 19, wherein said spacer extension along said multi-conductor probe corresponds to at least one half of a wavelength of the transmit signal at said center frequency.

21. The radar level gauge system according to claim 14, wherein said center frequency is in the range of 0.5 GHz to 3 GHz.

22. The radar level gauge system according to claim 14, wherein:
said transmit signal is modulated to exhibit a time-varying frequency;
said transceiver comprises a mixer for mixing said transmit signal and said surface echo signal to form an intermediate frequency signal; and
said processing circuitry is configured to determine said filling level based on said intermediate frequency signal.

* * * * *